United States Patent
O'Neil et al.

(10) Patent No.: US 7,188,161 B1
(45) Date of Patent: Mar. 6, 2007

(54) METHOD FOR CONFIGURING A NETWORK ELEMENT AT A CUSTOMER PREMISE VIA A MOBILE DATA TERMINAL

(75) Inventors: Joseph Thomas O'Neil, Staten Island, NY (US); Yzhak Ronen, West Windsor, NJ (US)

(73) Assignee: AT&T Corp., New York, NY (US)

( * ) Notice: Subject to any disclaimer, the term of this patent is extended or adjusted under 35 U.S.C. 154(b) by 585 days.

(21) Appl. No.: 10/364,060

(22) Filed: Feb. 11, 2003

(51) Int. Cl.
*G16F 15/177* (2006.01)
*H04L 9/00* (2006.01)
*H04K 1/00* (2006.01)

(52) U.S. Cl. .................. 709/220; 709/217; 709/218; 709/219; 709/221; 709/222; 709/223; 709/224; 709/225; 713/159; 713/168; 713/169; 713/170; 713/171; 713/186

(58) Field of Classification Search ........ 709/220–225, 709/217–219; 713/159, 186, 168–171
See application file for complete search history.

(56) References Cited

U.S. PATENT DOCUMENTS

| | | | |
|---|---|---|---|
| 5,956,716 A | 9/1999 | Kenner | |
| 6,122,648 A | 9/2000 | Roderick | |
| 6,154,744 A | 11/2000 | Kenner | |
| 6,219,790 B1 | 4/2001 | Lloyd | |
| 6,260,040 B1 | 7/2001 | Kauffman | |
| 6,286,038 B1 * | 9/2001 | Reichmeyer et al. | 709/220 |
| 6,341,304 B1 | 1/2002 | Engbersen | |
| 6,370,571 B1 | 4/2002 | Medin | |
| 6,411,933 B1 * | 6/2002 | Maes et al. | 704/273 |
| 6,519,636 B2 * | 2/2003 | Engel et al. | 709/223 |
| 6,684,241 B1 * | 1/2004 | Sandick et al. | 709/220 |
| 6,732,195 B1 * | 5/2004 | Baldwin | 710/6 |
| 6,766,165 B2 * | 7/2004 | Sharma et al. | 455/423 |
| 6,775,559 B1 * | 8/2004 | Weghorst et al. | 455/558 |
| 6,877,093 B1 * | 4/2005 | Desai et al. | 713/156 |
| 6,920,502 B2 * | 7/2005 | Araujo et al. | 709/229 |
| 6,920,557 B2 * | 7/2005 | Coffy et al. | 713/159 |
| 7,003,548 B1 * | 2/2006 | Barck et al. | 709/203 |
| 2004/0098619 A1 | 5/2004 | Shay | |

* cited by examiner

*Primary Examiner*—Saleh Najjar
*Assistant Examiner*—Shawki Ismail
(74) *Attorney, Agent, or Firm*—Michael Haynes PLC; Michael N. Haynes; Dale R. Jensen

(57) ABSTRACT

An enhanced network element and method for configuring and deploying computer network elements is disclosed. A customer orders a network element from an equipment provider. Upon receipt of the unconfigured network element, a Trusted Configuration Device (TCD) is shipped from a network provider to the customer. The TCD transmits information to the NE that enables it to download a configuration file from a Provisioning Server (PS) via a secure channel.

13 Claims, 23 Drawing Sheets

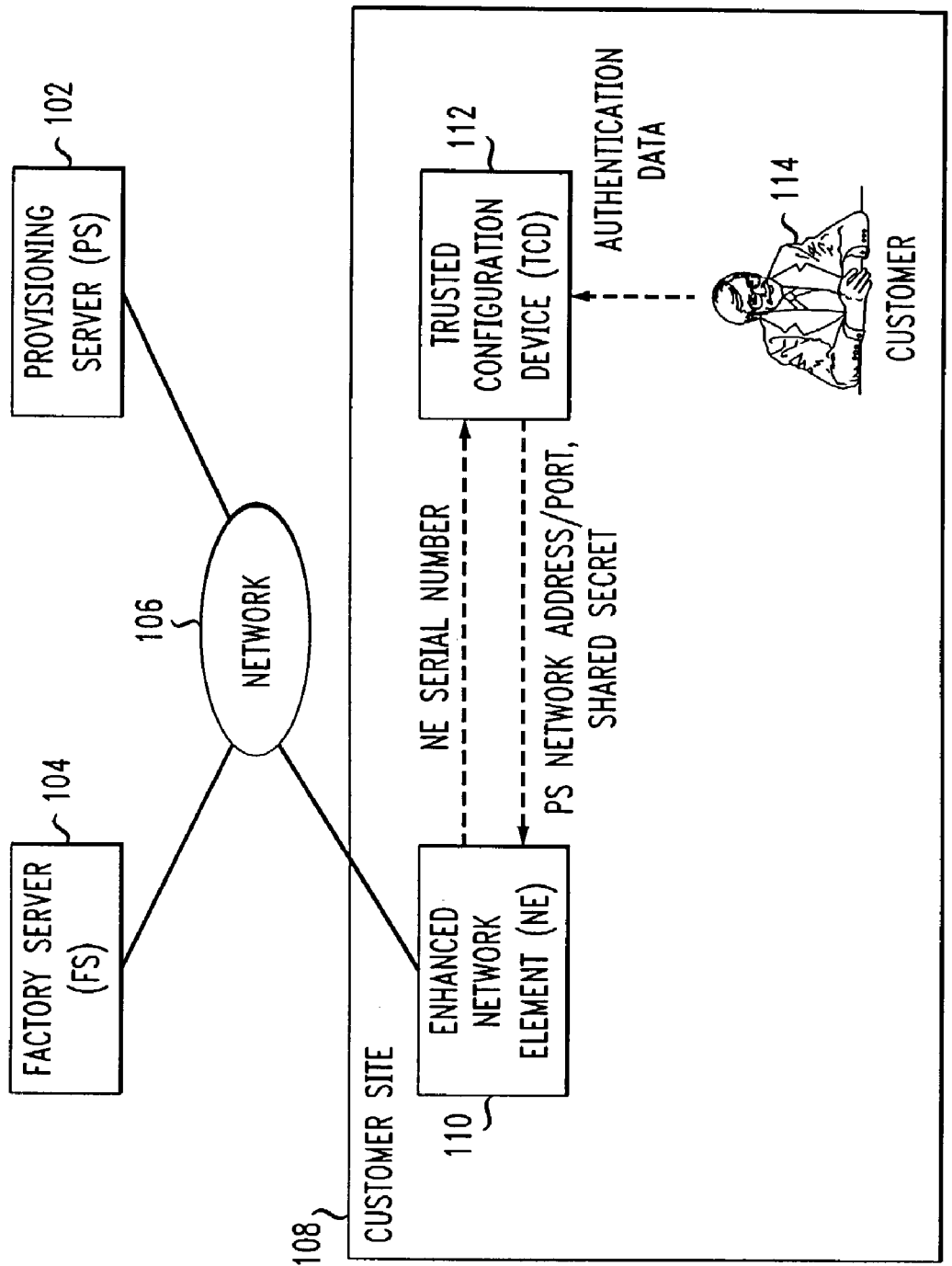

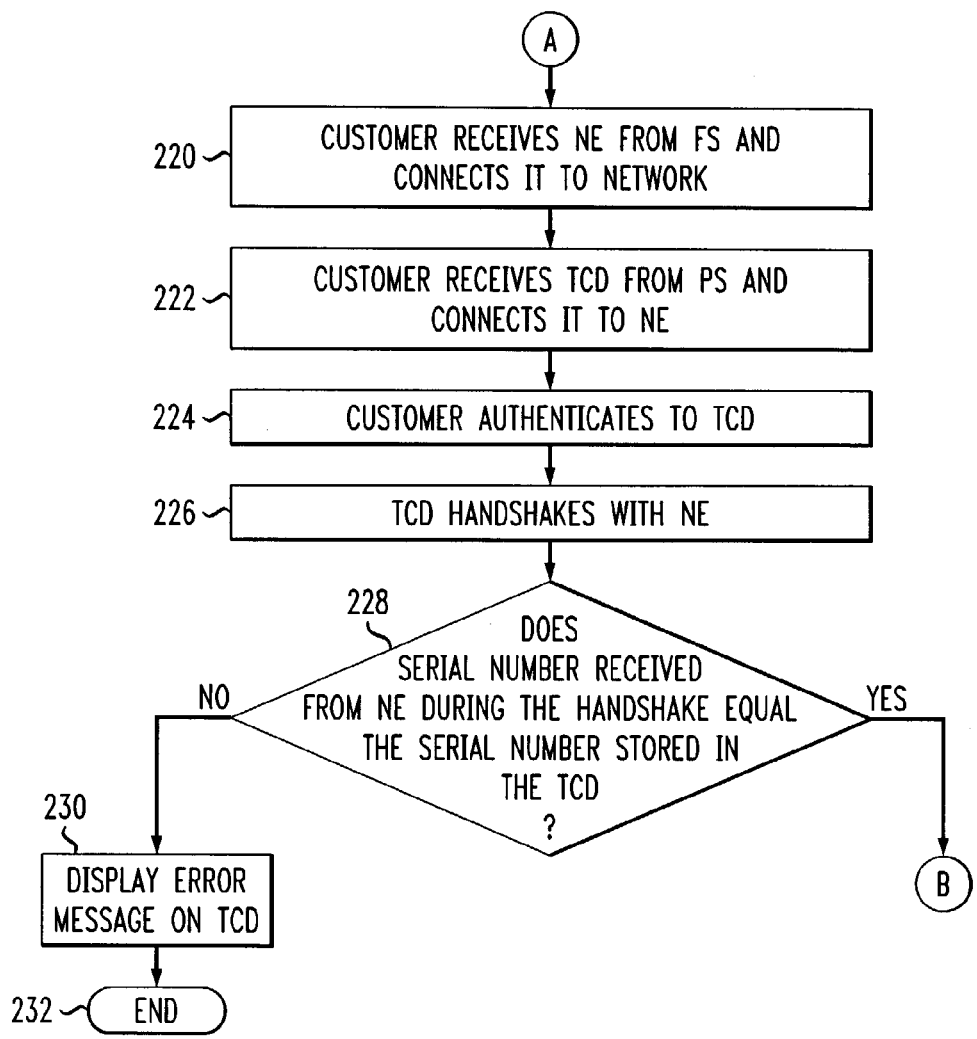

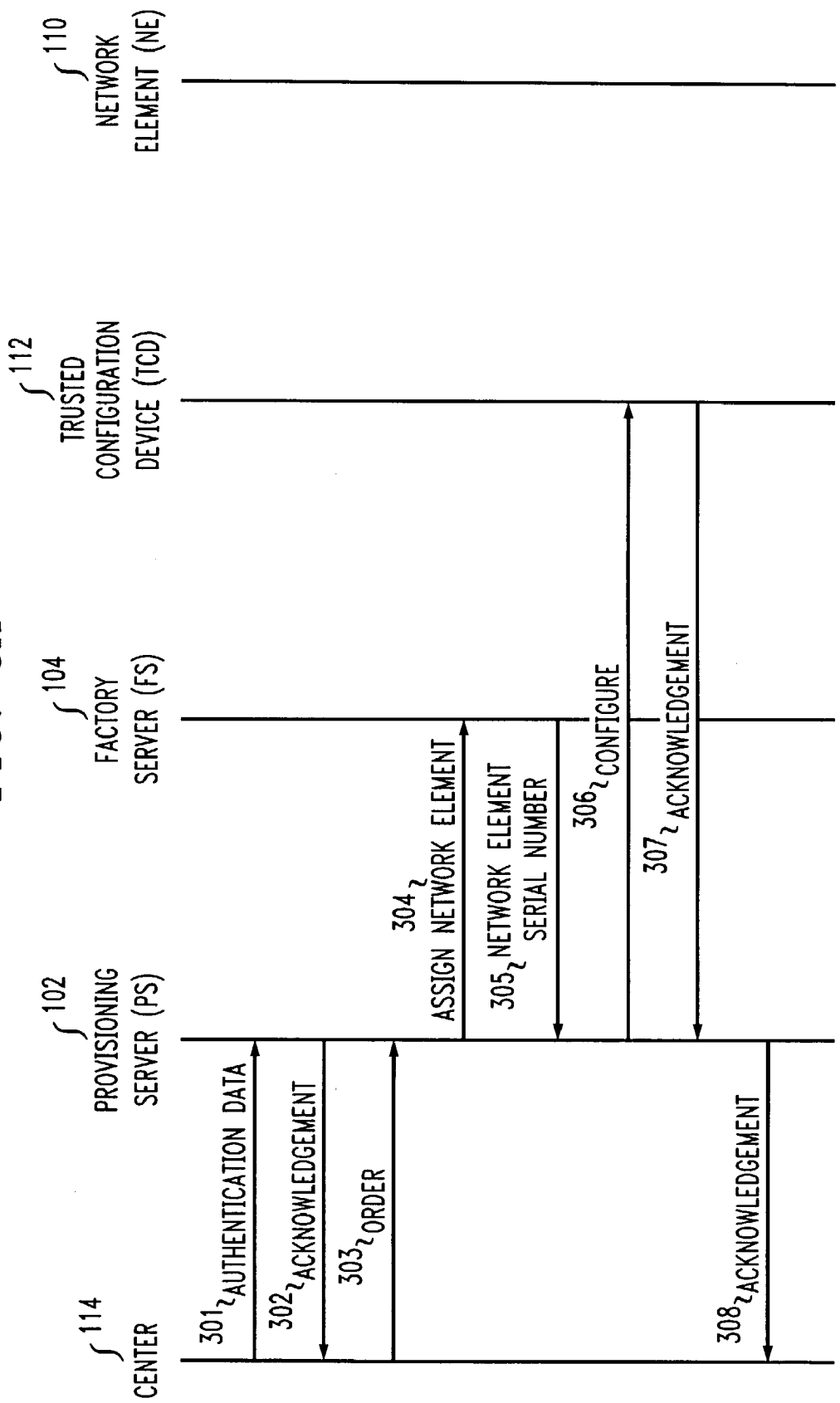

FIG. 4

304 — ASSIGN NETWORK ELEMENT (FROM PROVISIONING SERVER TO FACTORY SERVER):
(1) NETWORK ELEMENT TYPE
(2) CUSTOMER NAME
(3) CUSTOMER ADDRESS

305 — NETWORK ELEMENT SERIAL NUMBER (FROM FACTORY SERVER TO PROVISIONING SERVER):
(1) NETWORK ELEMENT TYPE
(2) NETWORK ELEMENT SERIAL NUMBER

306 — CONFIGURE (FROM PROVISIONING SERVER TO TCD):
(1) AUTHENTICATION DATA
(2) SHARED SECRET
(3) NETWORK ELEMENT SERIAL NUMBER
(4) NETWORK ADDRESS/PORT OF PROVISIONING SERVER

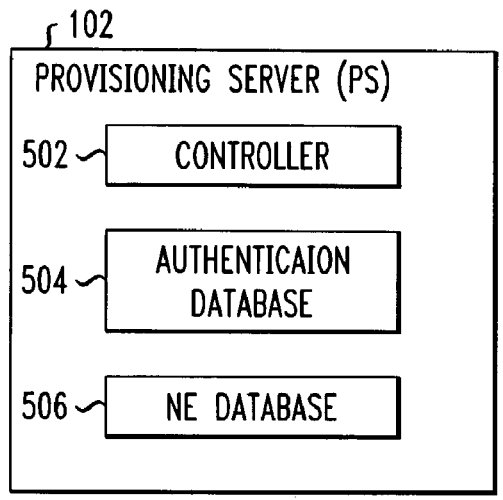

| CUSTOMER NAME | AUTHENTICATION TYPE | AUTHENTICATION FILE |
|---|---|---|
| JOE O'NEIL | FINGERPRINT | /authentication/oneil/fingerprint.data |
| JOE O'NEIL | RETINAL | /authentication/oneil/retinal.data |
| JOE O'NEIL | PASSWORD | /authentication/oneil/password.data |
| YZHAK RONEN | RETINAL | /authentication/ronen/retinal.data |
| YZHAK RONEN | PASSWORD | /authentication/ronen/password.data |
|  |  |  |

FIG. 7

| NE TYPE 702 | NE S/N 704 | CUSTOMER NAME 706 | CUSTOMER ADDRESS 708 | NE CONFIGURATION FILE 710 | SHARED SECRET 712 |
|---|---|---|---|---|---|
| 7500 ROUTER | 14680 | JONES | 10 MAIN STREET MIDDLETOWN, IOWA 50420 | /config/14680 | 438fsdu04 |
| 3600 ROUTER | 92376 | SMITH | 20 PALM STREET MIAMI, FLORIDA 33140 | /config/92376 | 9843274897745 |
| | | | | | |

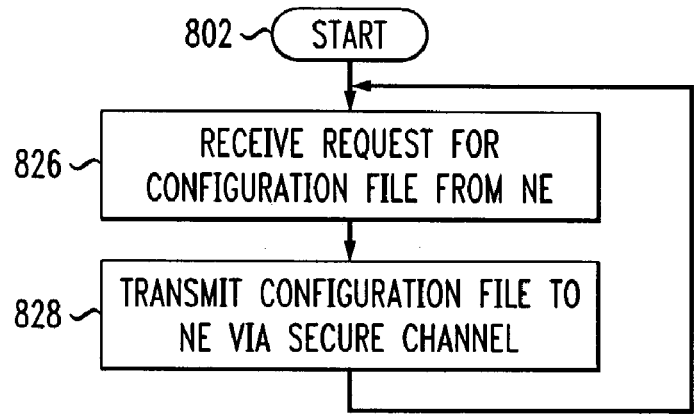
FIG. 8C
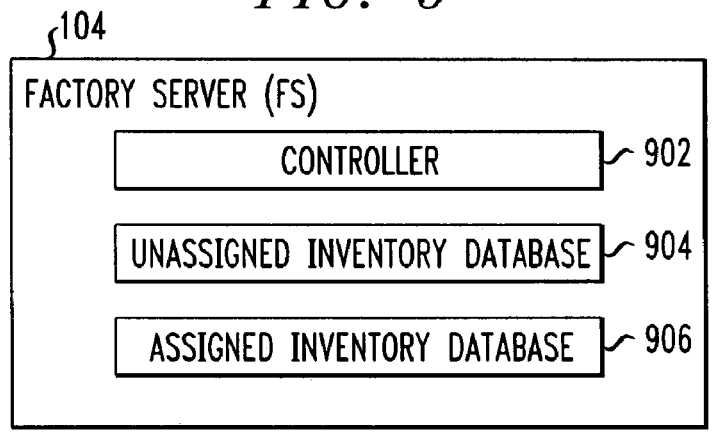
FIG. 9
FIG. 10
| NETWORK ELEMENT TYPE | NETWORK ELEMENT SERIAL NUMBER |
|---|---|
| 7500 ROUTER | 14680 |
| 3600 ROUTER | 92376 |
|  |  |

FIG. 11

| NETWORK ELEMENT TYPE (1102) | NETWORK ELEMENT SERIAL NUMBER (1104) | CUSTOMER NAME (1106) | CUSTOMER ADDRESS (1108) |
|---|---|---|---|
| 7500 ROUTER | 14680 | JONES | 10 MAIN STREET MIDDLETOWN, IOWA 50420 |
| 3600 ROUTER | 92376 | SMITH | 20 PALM STREET MIAMI, FLORIDA 33140 |
| | | | |

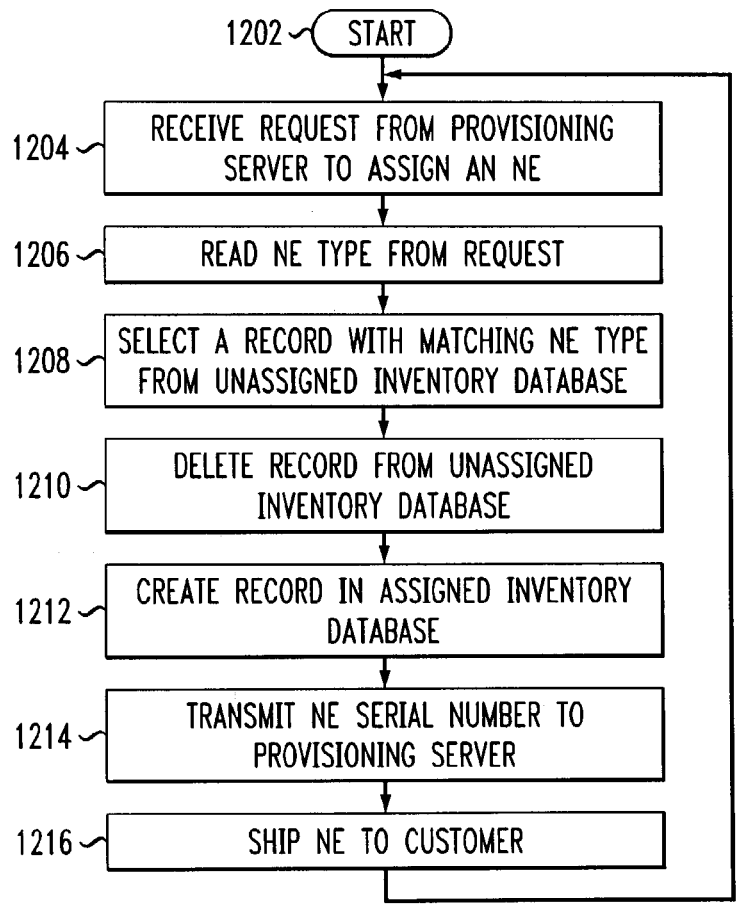
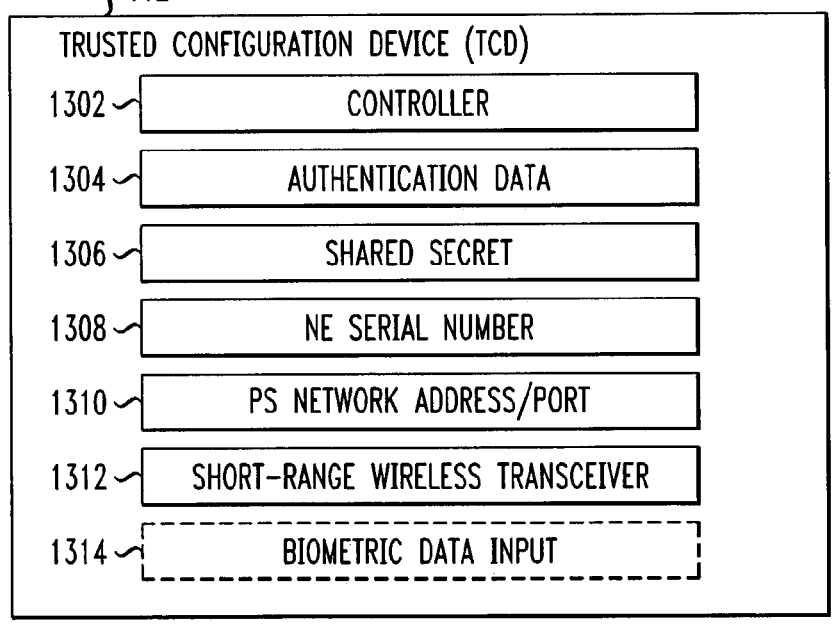

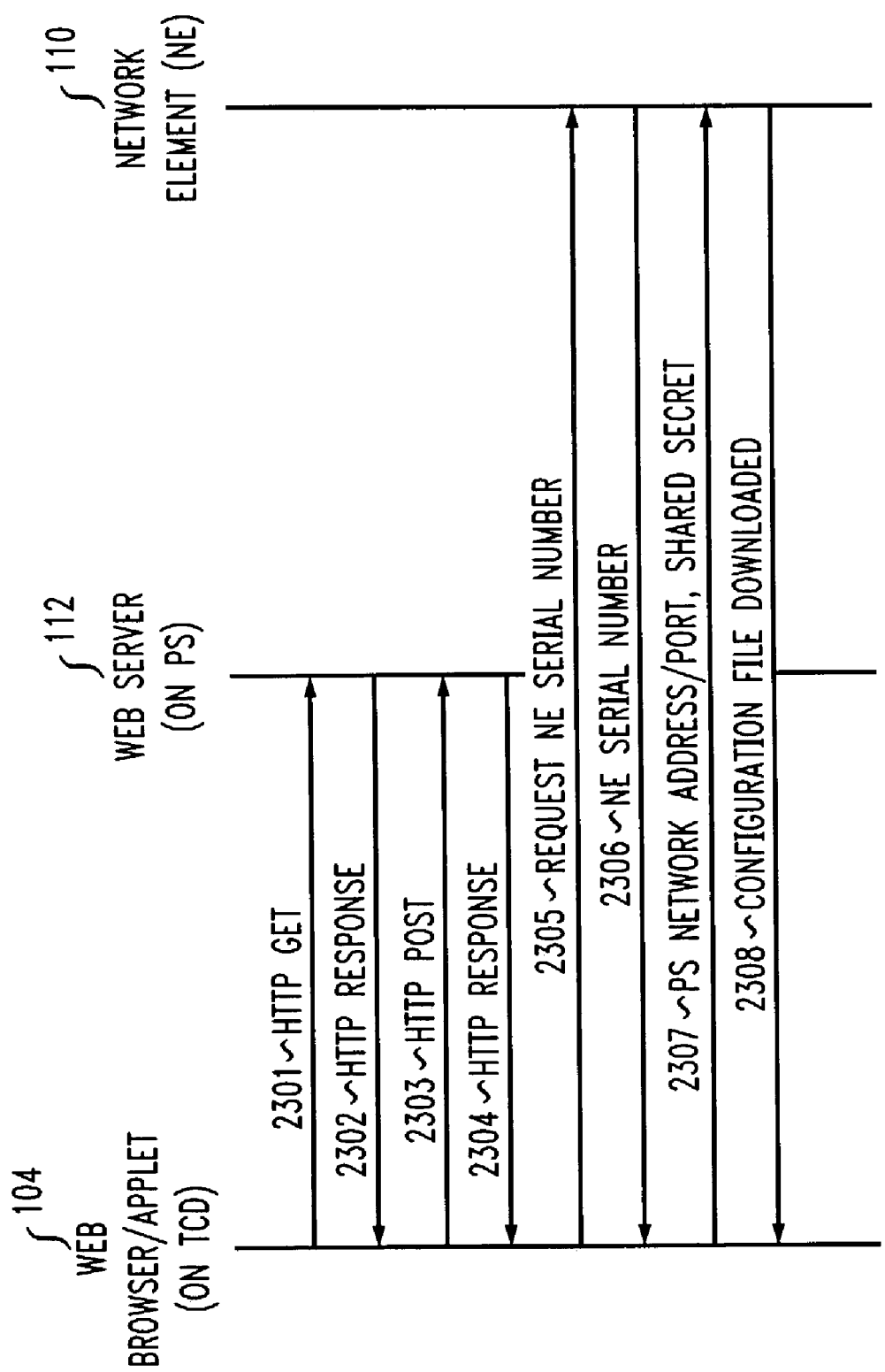

METHOD FOR CONFIGURING A NETWORK ELEMENT AT A CUSTOMER PREMISE VIA A MOBILE DATA TERMINAL

TECHNICAL FIELD

The present invention relates to configuring and deploying computer network elements via a mobile data terminal.

BACKGROUND OF THE INVENTION

The current process for configuring and deploying computer network elements is inefficient. A typical process consists of the following steps: (1) A customer submits an order to a network provider. (2) The provider submits an order to an equipment manufacturer. (3) The element is shipped from the manufacturer to a staging area maintained by the provider. (4) The element is configured at the staging area. (5) The element is shipped to the customer. (6) The element is connected to the network and enters normal operation.

The staging area is a source of inefficiency in this process. It requires cost and time to ship elements from the manufacturer to the staging area and from the staging area to the customer. Network and service providers typically maintain an inventory of elements at the staging area. This represents additional cost.

A significant savings could be achieved by eliminating the staging area. Unfortunately, the configuration data that must be installed on an element contains sensitive customer information. For example, router configuration can contain network addresses, encryption keys, and other data that would enable a computer hacker to seriously disrupt the operations of a network. This information cannot be shared with a manufacturer. Therefore, it is applied to the element in the secure environment of a staging area. The device is then shipped to a customer site.

SUMMARY OF THE INVENTION

The present invention overcomes the aforementioned deficiencies and eliminates the need for a staging area. Network elements can be shipped directly from an equipment manufacturer to a customer.

The present invention is directed to a method of configuring a network element at a customer premise via a mobile data terminal. The network element is connected to the mobile data terminal. The mobile data terminal is used to request a web page from a provisioning server. A customer is authenticated to the provisioning server via the web page. Upon authentication, a second web page and applet are downloaded from the provisioning server. A handshake is established between the network element and the applet. A serial number is received from the network element during the handshake. A determination is made as to if the received serial number matches a serial number stored by the mobile data terminal. If a match occurs, a provisioning server network address/port and shared secret is transmitted to the network element.

BRIEF DESCRIPTION OF THE DRAWING

The above-summarized invention will be more fully understood upon consideration of the following detailed description and the attached drawings wherein:

FIG. 1 shows the system architecture.
FIGS. 2A–2C show a flowchart of the system operation.
FIGS. 3A–3B show a message sequence diagram for the system.
FIG. 4 shows the formats of some messages exchanged among the system components.
FIG. 5 shows a block diagram of the Provisioning Server (PS).
FIG. 6 shows the format of the Authentication Database on the PS.
FIG. 7 shows the format of the TCD Database on the PS.
FIGS. 8A–8C show flowcharts of the PS.
FIG. 9 shows a block diagram of the Factory Server (FS).
FIG. 10 shows the format of the Unassigned Inventory Database on the FS.
FIG. 11 shows the format of the Assigned Inventory Database on the FS.
FIG. 12 shows a flowchart for the FS.
FIG. 13 shows a block diagram of a Trusted Configuration Device (TCD).
FIG. 23 shows a message sequence diagram.

DETAILED DESCRIPTION

FIG. 1 shows the system architecture. The four components of the invention are Provisioning Server (PS) 102, Factory Server (FS) 104, Network Element (NE) 110, and Trusted Configuration Device (TCD) 112.

The PS, FS, and NE connect to network 106. This network can use any technology in the current art such as circuit-based or packet-based networks. See Computer Networks Fourth Edition, by Andrew Tanenbaum, Prentice Hall, 2002, for an overview of this topic.

A network provider owns the PS 102. The primary responsibilities of the PS are: (1) receive customer orders, (2) transmit orders to the FS 104, (3) generate a configuration file for a NE 110, (4) configure a TCD 112, (5) ship a TCD 112 to a customer 114, (6) receive a request from an NE 110 for its configuration file, and (7) transmit a configuration file to an NE 110 via a secure channel.

An equipment vendor owns the FS 104. The primary responsibilities of the FS 104 are: (1) receive orders for network elements from the PS 102, (2) select a network element from unassigned inventory at the factory, (3) provide the serial number of an assigned network element to the PS 102, and (4) ship an assigned network element to a customer 114.

The PS and FS can be implemented by using servers in the current art. This includes hardware from vendors such as Sun Microsystems, Hewlett Packard, IBM, Dell, and others.

A customer owns the NE 110. The NE can be a router, switch, firewall, gateway, or any other equipment in the current art. The NE is enhanced for this invention. Its primary responsibilities are: (1) transmit its serial number to the TCD 112, (2) receive the PS 102 network address/port and a shared secret from the TCD 112, (3) establish a secure channel to the PS 102, and (4) download a configuration file via the secure channel.

The TCD 112 is configured by the PS 102 and shipped to the customer 114. The customer uses the TCD 112 to configure the enhanced NE 110 with the minimum information needed to establish a secure channel to the PS 102. This secure channel is then used to download a configuration file to the NE 110.

There are several alternatives for connecting the TCD 112 to the NE 110. A short-range wireless link can be used for this purpose. Bluetooth (http://www.bluetooth.org) and WiFi (http://www.weca.net) are examples of such technologies. An infrared link or hard-wired connection can be used.

Figure 2A:
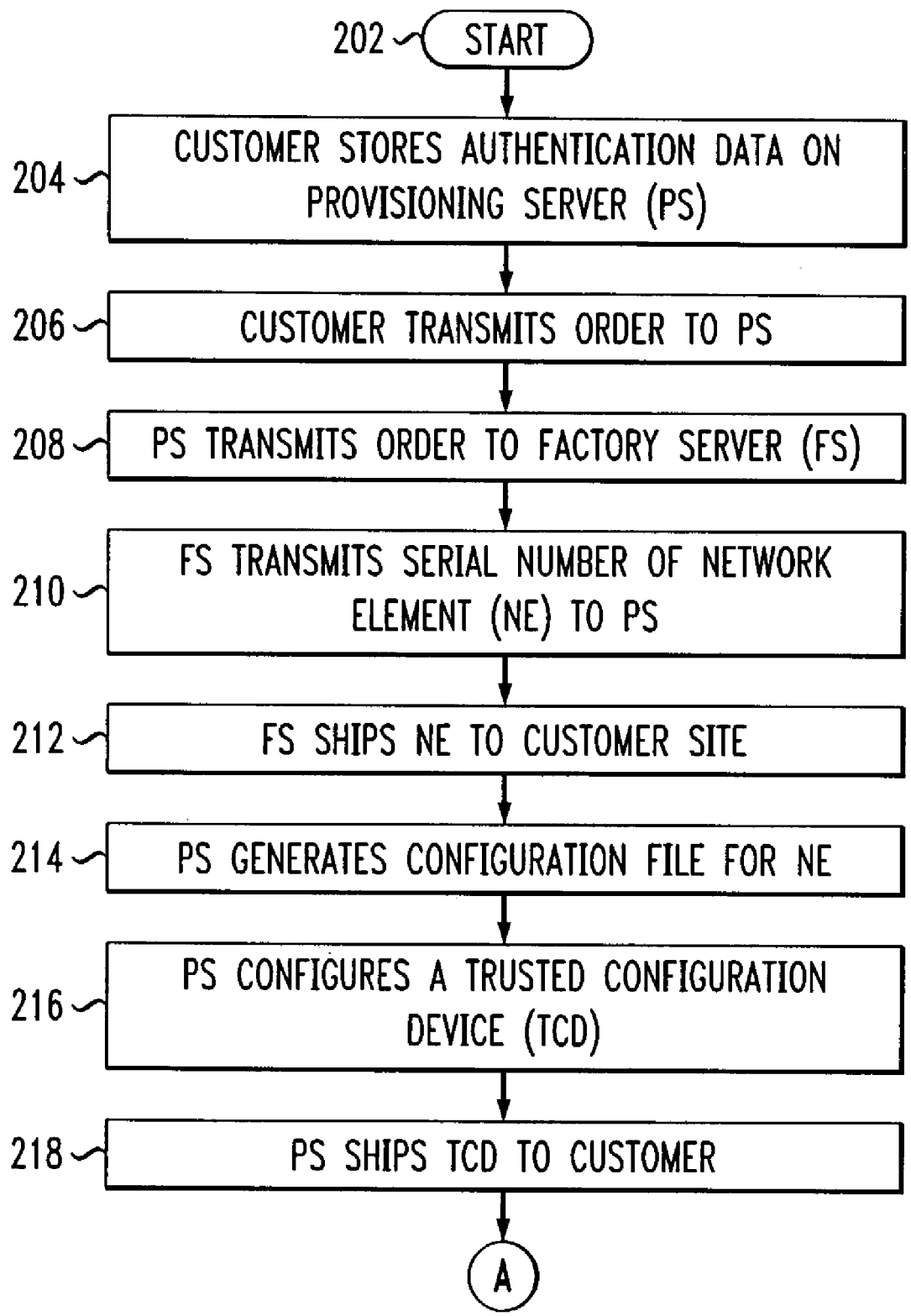
Figure 2C:
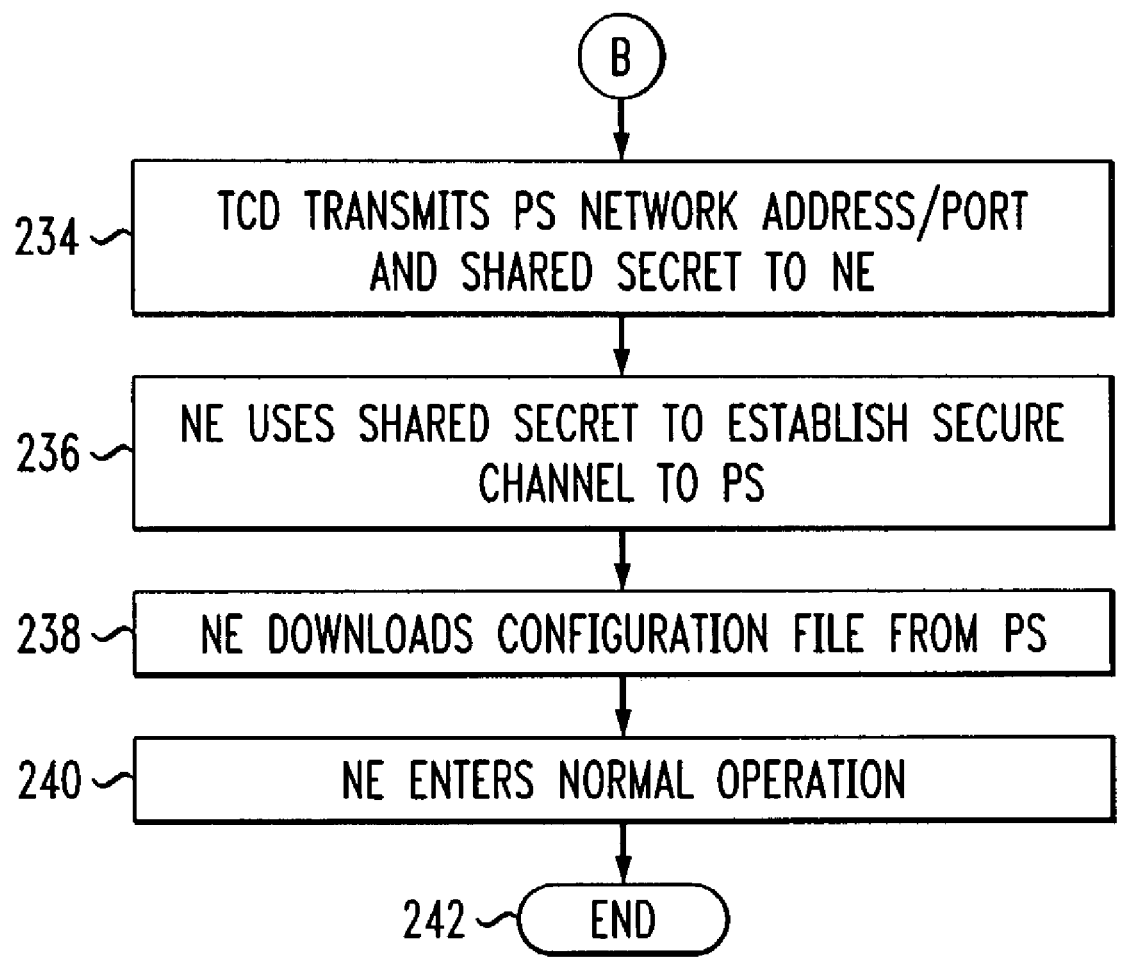

FIG. 2 shows a flowchart of the system operation. Execution starts at step 202. A customer stores authentication data on the PS 102 at step 204. This data can be a login and password. It may also be any type of biometric information such as fingerprint, retinal, speech, or handwriting data. The customer transmits an order to the PS 102 at step 206. A command line interface, Web interface, or any other technique in the current art may be used to submit the order.

The PS 102 transmits an order to the FS 104 at step 208. This order specifies the device type and the circuit boards to be included in the device. However, the order does not include any sensitive configuration information such as addresses or encryption keys. The order can be formatted using Extensible Markup Language (XML) or any technique in the current art. The order can be transferred from the Provisioning Server to the manufacturer using a protocol such as Simple Object Access Protocol (SOAP) or any other technique in the current art.

The FS 104 selects unassigned inventory that satisfies the criteria in the order. It then transmits the serial number of the NE 110 to the PS 102 at step 210. The FS 104 ships the NE 110 to the customer site 108 at step 212. The customer name and address that were received at step 206 are used for this purpose.

The PS 102 generates a configuration file for the NE 110 at step 214. This is done with information from the order. The configuration file contains sensitive customer information such as network topology, addresses, and security parameters. The manual and/or automatic procedures to generate a configuration file from the information provided in the customer order are outside the scope of this patent. However, the current art provides a variety of tools that can be used for this purpose. For example, Syndesis generates configuration files that can be loaded into routers. See http://www.syndesis.com for more information.

A network element manufacturer determines the format used for configuration data. For example, Cisco routers and switches use a text format that is defined in documents at http://www.cisco.com. Information about other vendors can be found at .their Web sites.

The PS 102 configures a TCD 112 at step 216. The configuration includes authentication data, a shared secret, NE serial number, and PS network address/port. A random number generator is used to compute the shared secret. The PS 102 ships the TCD 112 to the customer 114 at step 218.

The customer 114 receives the NE 110 from the FS 104 and connects it to the network 106 at step 220. The customer 114 receives the TCD 112 from the PS 102 and connects it to the NE 110 at step 222. This can be done via short-range wireless technology. Alternatively, infrared communication or a hard-wired link can be used.

The customer 114 authenticates to the TCD 112 at step 224. This is done with the data that was configured on the device at step 216. A handshake between the TCD 112 and NE 110 occurs at step 226. The unique serial number of the NE 110 is transferred to the TCD 112 during this handshake. This value is checked at step 228. If it does not equal the value that is stored in the TCD 112, an error message is displayed at step 230 and execution stops. Otherwise, execution proceeds to step 234.

The TCD 112 transmits the PS network address/port and shared secret to the NE 110 at step 234. The NE 110 uses the shared secret to establish a secure channel to the PS 102 at step 236. The NE 110 downloads its configuration file from the PS 102 at step 238 and enters normal operation at step 240.

Figure 3B:
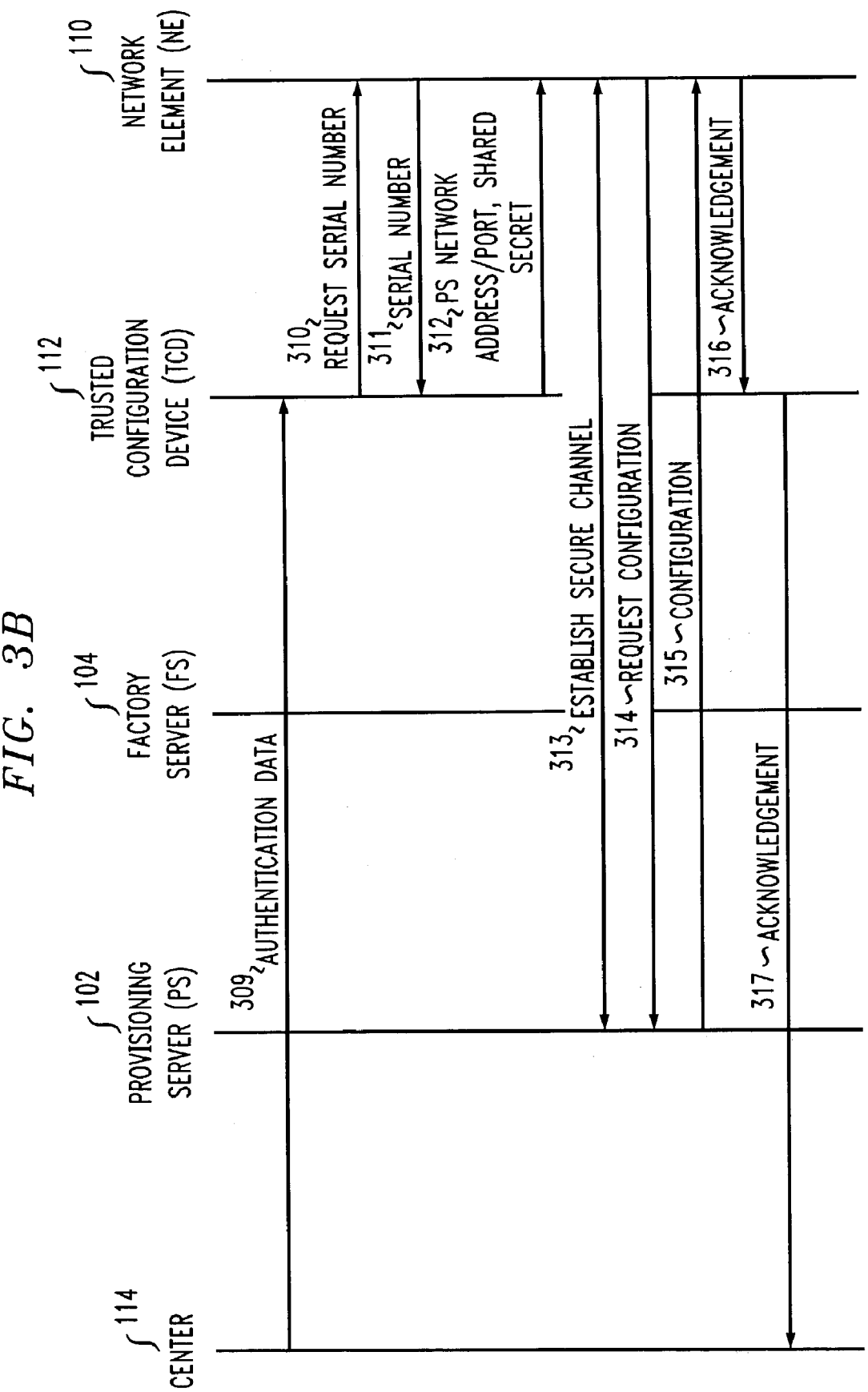

FIGS. 3A–3B show a message sequence diagram for the system. Message 301 is the authentication data from the customer. This information is stored in an Authentication Database (not shown) that is resident in the PS 102. It is to be understood by those skilled in the art that the Authentication Database may also be an adjunct database to the PS 102. Message 302 is the acknowledgement.

Message 303 is the order generated by the customer 114. It contains the customer name and address. It specifies the type of network element that is being requested. It also contains sufficient details so the PS 102 can generate a complete configuration file for that network element.

Message 304 is the command to assign an NE 110 to this customer 114. It is transmitted from the PS 102 to the FS 104. This message contains a subset of the data from the customer order. Specifically, the customer name, customer address, and network element type are included. Sensitive information such as addresses, encryption keys, and other data are not included. Message 305 is the response to message 304. It contains the serial number of the NE 110 that was shipped to the customer.

Message 306 is the command to configure the TCD 112. This message contains customer authentication data, shared secret, NE serial number, and PS network address/port. The TCD 112 acknowledges receipt of this request with message 307.

Message 308 is the acknowledgement sent from the PS 102 to the customer 114. This message informs the customer that their order has been processed and that a TCD has been shipped.

Message 309 represents the entry of authentication data to the TCD 112. The TCD 112 checks if the data entered by the customer 114 matches the values in its storage. If not, an error message is displayed for the customer 114. Otherwise, message 310 is transmitted to the NE 110 to request its serial number. Message 311 is the response to that request. It contains the serial number. The TCD 112 checks if the serial number matches the value in its local storage. If not, an error message is displayed for the customer. Otherwise, message 312 is transmitted to the NE 110. This contains the PS network address/port and the shared secret.

Message exchange 313 establishes a secure channel between the PS 102 and NE 110. The IKE and IPSEC protocols in the current art can be used for this purpose. Details about these protocols can be found at http://www.ietf.org. Message 314 requests the configuration file for the NE 110 from the PS 102. The response is message 315.

Message 316 is transmitted from the NE 110 to the TCD 112 to acknowledge that the configuration has been received and the NE 110 has entered normal operation. This acknowledgement is forwarded to the customer 114 as message 317.

FIG. 4 shows the formats of some messages that are exchanged among the system components. The assign network element message 304 is transmitted from the PS 102 to the FS 104. The message contains the network element type, customer name, and customer address. The FS 104 processes this message by selecting an unassigned network element from the factory inventory and shipping the equipment directly to the customer 114.

The network element serial number message 305 is transmitted from the FS 104 to the PS 102 as a response to the assign network element message 304. The message contains the network element type and serial number.

The configure message 306 is transmitted from the PS 102 to the TCD 112. The message contains authentication data, shared secret, NE serial number, and PS network address/port.

FIG. 5 shows a block diagram of the Provisioning Server (PS) 102. Controller 502 is the code that manages the operation of the PS 102. Authentication Database 504 stores information that is used to authenticate customers. TCD Database 506 stores information about each TCD 112 that is shipped to a customer 114.

FIG. 6 shows the format of the Authentication Database 504 on the PS 102. This table contains one record for each type of authentication that can be performed for each customer. Each record contains a customer name 602, authentication type 604, and an authentication file 606. The latter is a file in which biometric information is stored.

The sample data shown in FIG. 6 illustrate that several types of authentication data can be stored for a customer. For example, there are three records for customer Joe O'Neil. Fingerprint, retinal, and password information is stored in three different files. There are two records for customer Yzhak Ronen. These define retinal and password data that can be used to authenticate that individual. The number and types of authentication data that are stored on a TCD 112 depend on the capabilities of that device. If a TCD 112 can accept both retinal and speech input, the PS 102 configures the TCD 112 with both the retinal and speech authentication files. The information may also be based on the level of security and sensitivity of the data contained in the configuration file.

FIG. 7 shows the format of the NE Database 506 on the PS 102. This table contains one record for each NE 110 that is shipped to a customer 114. Each record contains the NE type 702, NE serial number 704, customer name 706, customer address 708, NE configuration file 710, and shared secret 712. The NE type, customer name, and customer address are obtained from the customer order. The NE serial number is obtained from the FS 104. The NE configuration file is created from information in the customer order. A random number generator creates the shared secret.

Figure 8A:
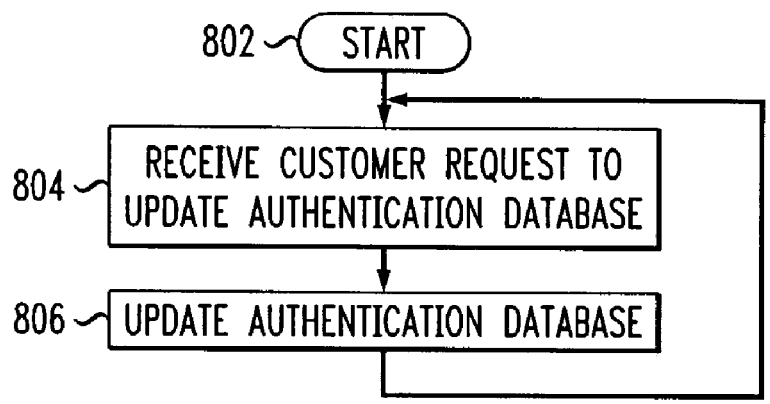
Figure 8B:
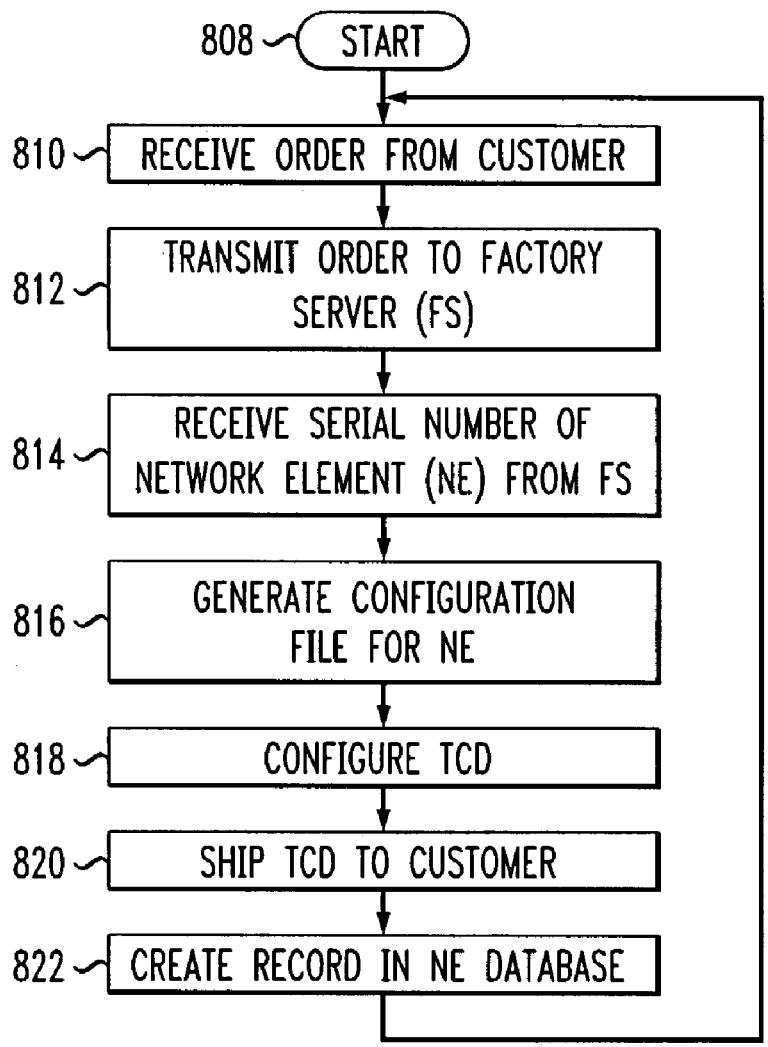

FIGS. 8A–8C show flowcharts of the PS 102. This is the code that comprises the Controller 502 of the PS 102. The software is structured into three threads. The first thread processes requests to update authentication data. The second thread processes customer orders. The third thread processes requests from NEs for configuration files.

FIG. 8A outlines the first thread. Execution begins at step 802. A customer request to update authentication data is received at step 804. These requests can be received via electronic mail, file transfer, voice mail, or a Web interface. The Authentication Database 504 is updated at step 806.

FIG. 8B outlines the second thread. Execution begins at step 808. An order is received from a customer 114 at step 810. The order is transmitted to the FS 104 at step 812. The NE serial number is received at step 814. A configuration file for the NE 110 is generated and stored at step 816. The TCD 112 is configured with authentication data, shared secret, NE serial number, and PS network address/port at step 818. The TCD 112 is shipped to the customer 114 at step 820. A record is created in the TCD Database at step 822. Execution continues at step 810

FIG. 8C outlines the third thread. Execution begins at step 824. A request for a configuration file is received from an NE 110 at step 826. A secure channel is established to the NE 110 by using the shared secret for that NE 110. The channel can be created by techniques in the current art such as IKE and IPSEC. The configuration file is transmitted to the NE 110 via the secure channel at step 828. Execution continues at step 826.

FIG. 9 shows a block diagram of the Factory Server (FS) 104. Controller 902 is the code that manages the operation of the FS 104. Unassigned Inventory Database 904 stores information about each NE that has not been assigned to a customer. The Assigned Inventory Database 906 stores information about each NE 110 that has been assigned to a customer 114.

FIG. 10 shows the format of the Unassigned Inventory Database 904 on the FS 104. This table contains one record for each device in the factory inventory that has not been assigned to a customer. Each record contains fields for the NE type 1002 and NE serial number 1004. A record is added to this table when an NE is produced at the factory. A record is removed from this table when an NE is shipped to a customer.

FIG. 11 shows the format of the Assigned Inventory Database 906 on the FS 104. This table contains one record for each device in the factory inventory that has been assigned to a customer. Each record contains fields for the NE type 1102, NE serial number 1104, customer name 1106, and customer address 1108. A record is added to this table when an NE is shipped from the factory.

FIG. 12 shows a flowchart for the FS 104. Execution starts at step 1202. A request to assign an NE is received from the PS 102 at step 1204. The NE type is read from the request at step 1206. A record with a matching NE type is selected from the Unassigned Inventory Database 904 at step 1208. The record is deleted from that database at step 1210 and a record is created in the Assigned Inventory Database 906 at step 1212. The NE serial number is transmitted to the PS 102 at step 1214. The NE 110 is shipped to the customer 114 at step 1216. Execution continues at step 1204.

FIG. 13 shows a block diagram of the Trusted Configuration Device (TCD) 112. Controller 1302 is the code that manages the operation of the TCD 112. Four data items are stored on the TCD 112 by the PS 102. These are authentication data 1304, shared secret 1306, NE serial number 1308, and PS network address/port 1310. Short-range wireless transceiver 1312 is used to communicate with the enhanced NE 110. Biometric data input 1314 is optional. For example, a TCD 112 may include a retinal or image scanner. It may include capabilities for handwriting or speech capture.

Figure 14:
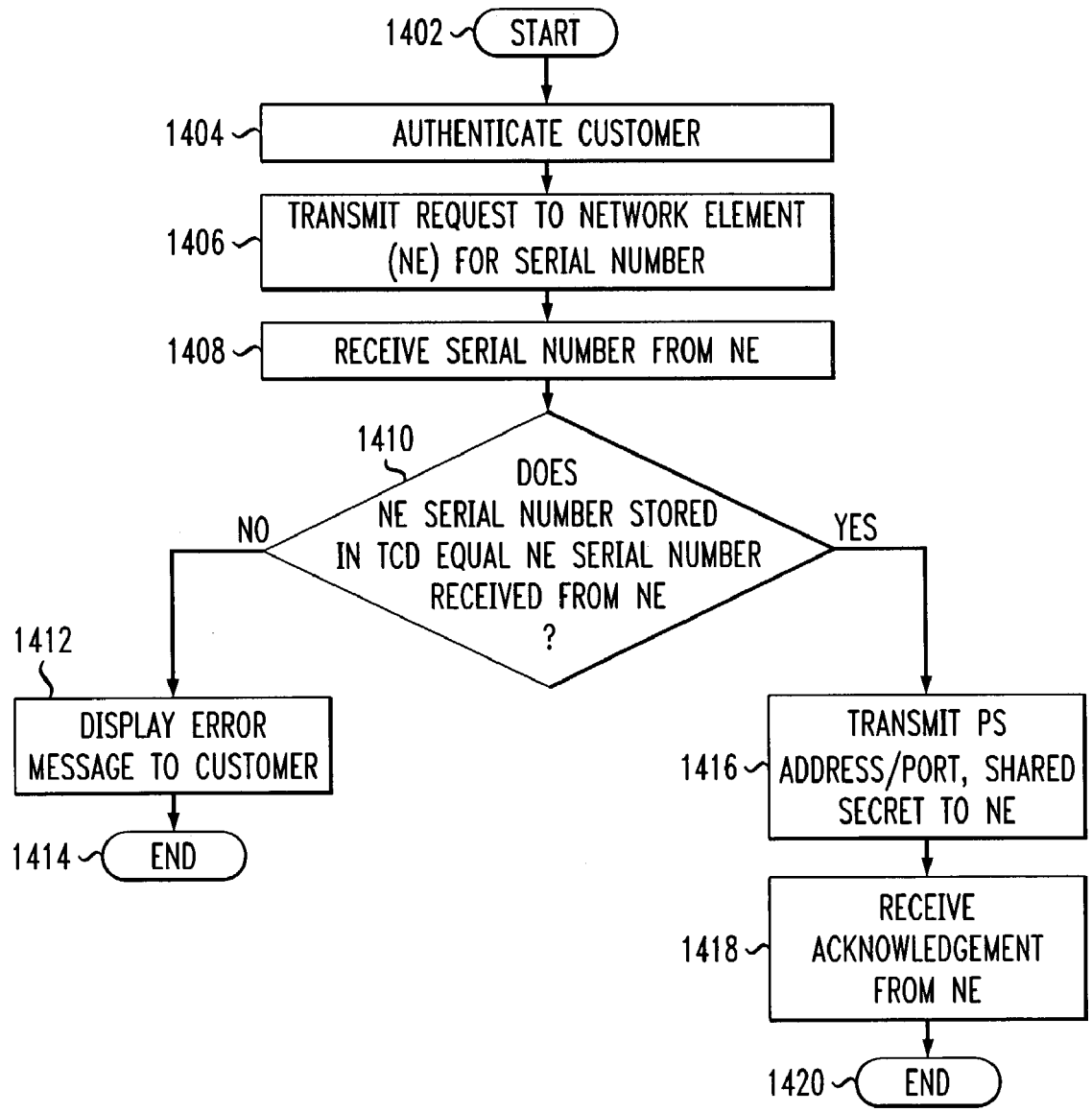
FIG. 14 shows a flowchart for a TCD.

FIG. 14 shows a flowchart for the TCD 112. Execution begins at step 1402. The customer 114 is authenticated at step 1404. A request for the NE serial number is transmitted to the NE 110 at step 1406. A response is received at step 1408. A check is done at step 1410 to determine if the NE serial number received from NE 110 matches the NE serial number 1308 that is stored in the TCD 112. If no, an error message is displayed to the customer 114 at step 1412 and execution ends at step 1414. Otherwise, the shared PS network address/port 1310 and shared secret 1306 are transmitted to the NE 110 at step 1416. An acknowledgement is received from the NE 110 at step 1418 and execution ends at step 1420.

Figure 15:
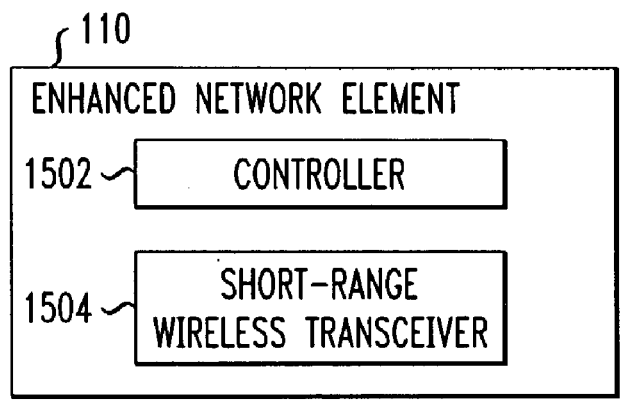
FIG. 15 shows a block diagram of an enhanced Network Element (NE).

FIG. 15 shows a block diagram of an enhanced Network Element (NE) 110. Controller 1502 is the code that manages the operation of the element. Short-range wirelesss transceiver 1504 is used to communicate with the TCD 112.

Figure 16:
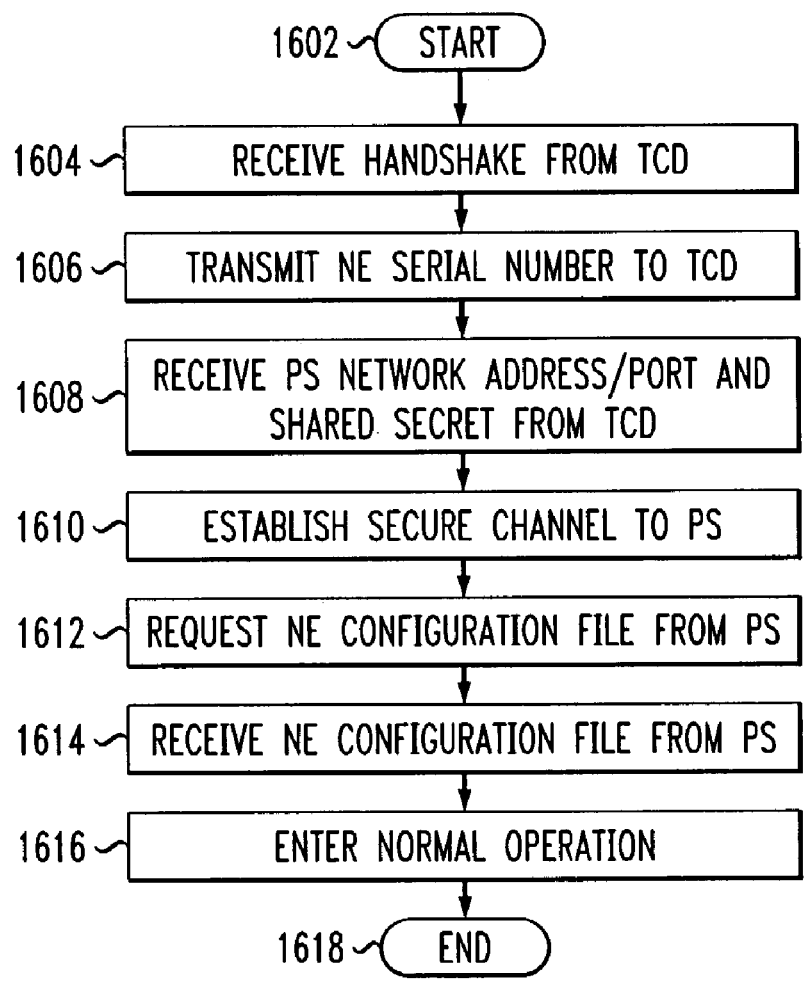
FIG. 16 shows a flowchart for an enhanced NE.

FIG. 16 shows a flowchart for an enhanced NE 110. Execution starts at step 1602. A handshake is received from a TCD 112 at step 1604. The unique serial number of the NE 110 is read and is transmitted to the TCD 112 at step 1606. The PS network address/port and shared secret are received from the TCD 112 at step 1608. A secure channel to the PS 102 is established at step 1610. The NE configuration file is requested from the PS 102 at step 1612. The NE configuration file is received from the PS 102 at step 1614. The NE 110 enters normal operation at step 1616.

A second embodiment of the current invention eliminates the TCD. Instead, a Mobile Data Terminal (MDT) is used to initialize the NE. Cell phones, portable digital assistants, and laptop computers are examples of MDTs in the current art that can perform this function.

Figure 17:
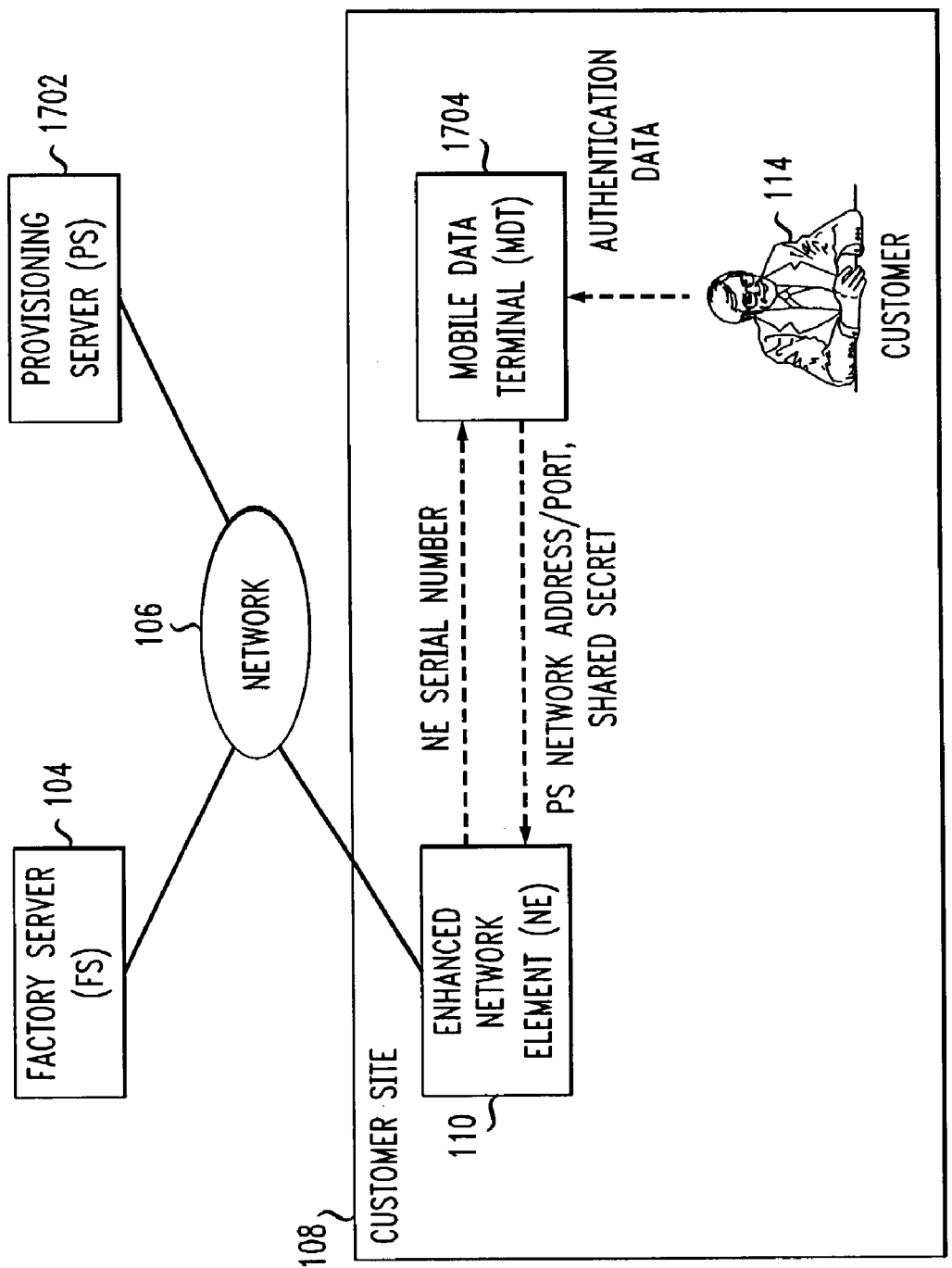
FIG. 17 shows the system architecture for a second embodiment of the invention.

FIG. 17 shows the system architecture for a second embodiment of the invention. This architecture is similar to FIG. 1 with two exceptions. First, the PS 1702 includes a Web server and server pages. Second, a Mobile Data Terminal (MDT) 1704 replaces the TCD.

The MDT 1704 is equipped with both a short-range wireless transceiver and a long-range wireless transceiver. The former enables communication with the NE 110 and the latter enables communication with the PS 1702. The MDT 1704 includes a Web browser that can retrieve and display pages retrieved from the PS 1702.

Figure 18A:
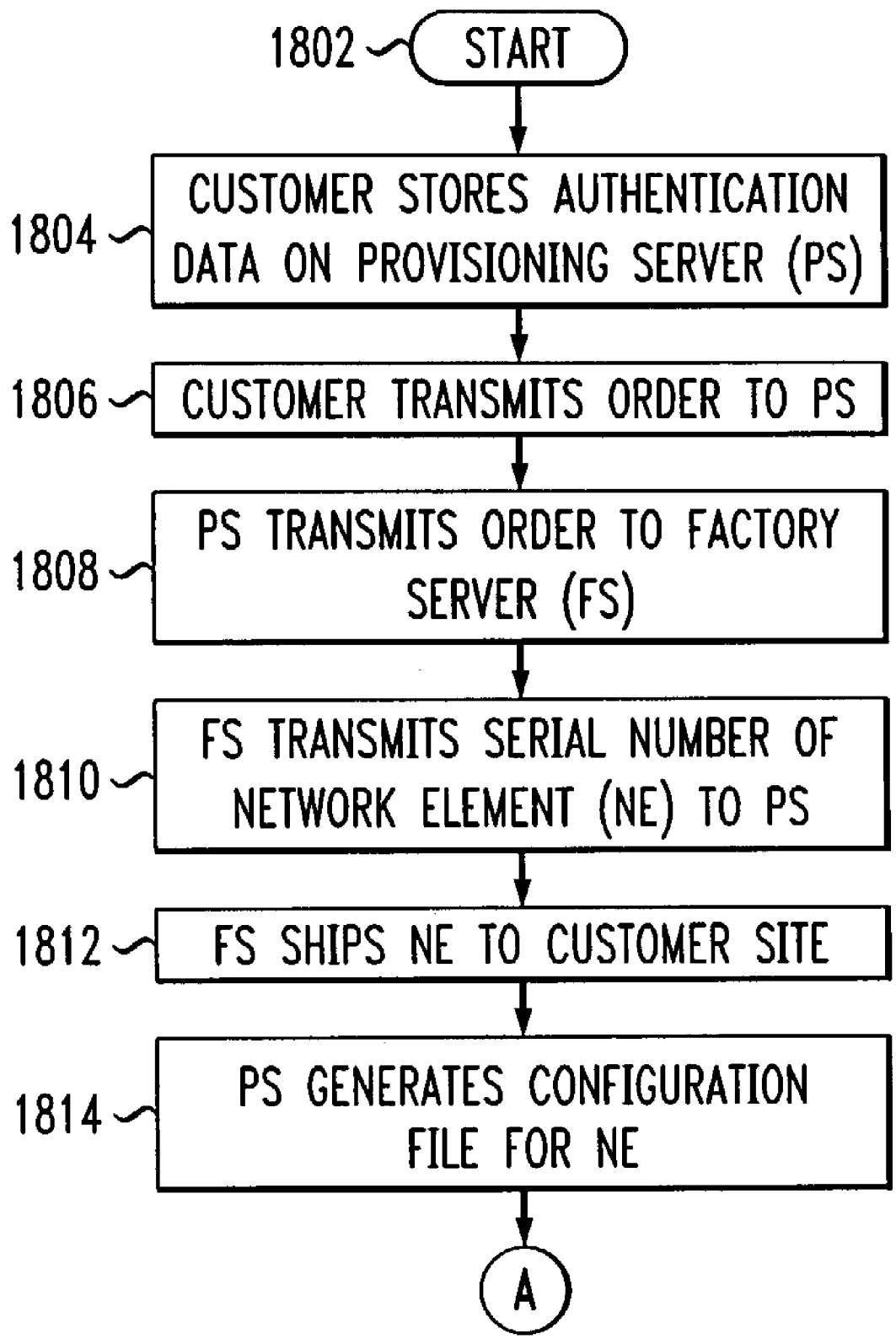
FIGS. 18A–18D shows a flowchart of the system operation.
Figure 18B:
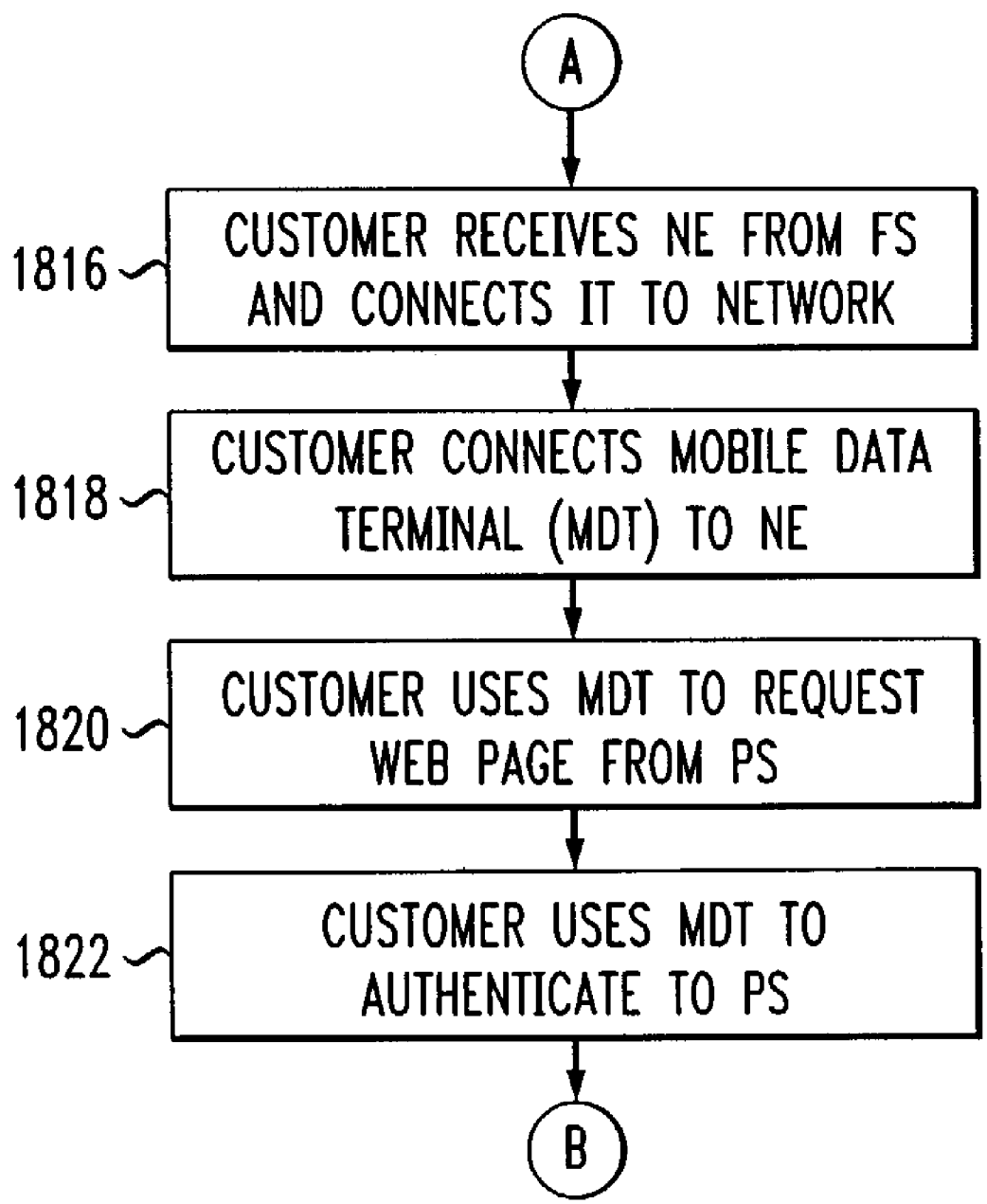
Figure 18C:
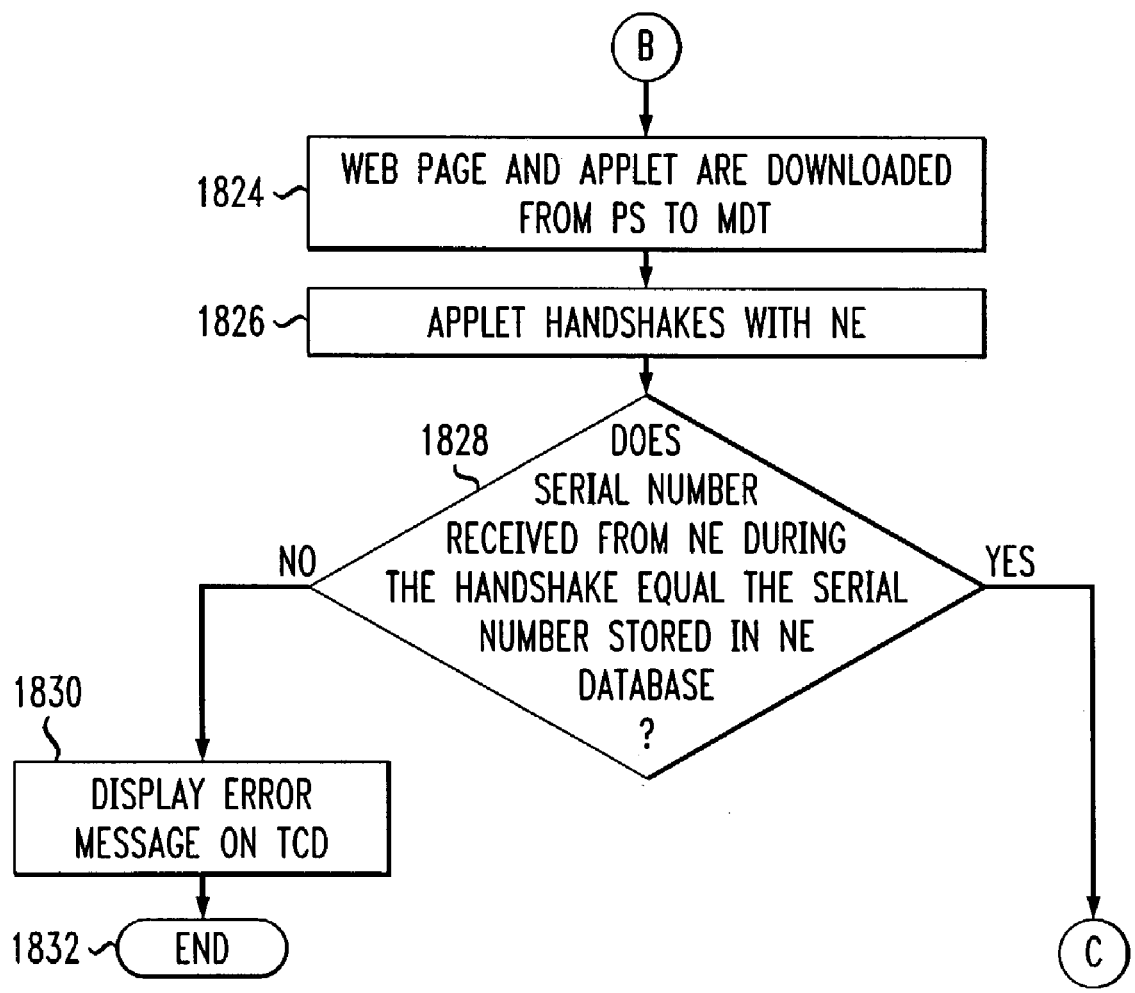
Figure 18D:
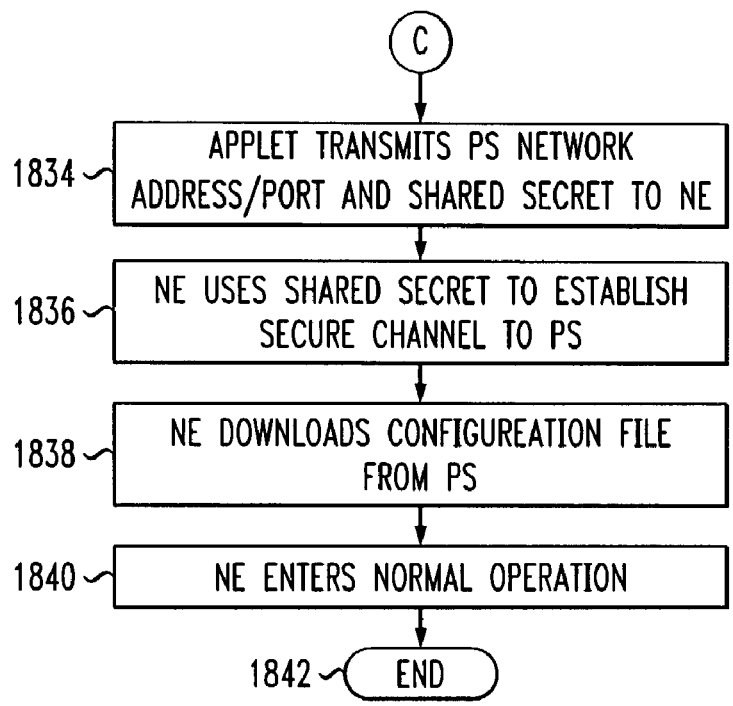

FIGS. 18A–18 18D shows a flowchart of the system operation. Execution starts at step 1802. A customer 114 stores authentication data on the PS 1702 at step 1804. This data can be a login and password. It may also be any type of biometric information such as fingerprint, retinal, speech, or handwriting data. The customer 114 transmits an order to the PS 1702 at step 1806. A command line interface, Web interface, or any other technique in the current art may be used to submit the order.

The PS 1702 transmits an order to the FS 104 at step 1808. This order specifies the device type and the circuit boards to be included in the device. However, the order does not include any sensitive configuration information such as addresses or encryption keys. The order can be formatted using Extensible Markup Language (XML) or any technique in the current art. The order can be transferred from the Provisioning Server to the manufacturer using the Simple Object Access Protocol (SOAP) or any technique in the current art.

The FS 104 selects unassigned inventory that satisfies the criteria in the order. It then transmits the serial number of the NE 110 to the PS 1702 at step 1810. The FS 104 ships the NE 110 to the customer site 108 at step 1812. The customer name and address that were received at step 1806 are used for this purpose.

The PS 1702 generates a configuration file for the NE 110 at step 1814. This is done with information from the order. The configuration file contains sensitive customer information such as network topology, addresses, and security parameters. The manual and/or automatic procedures to generate a configuration file from the information provided in the customer order are outside the scope of this patent. However, the current art provides a variety of tools that can be used for this purpose. For example, Syndesis generates configuration files that can be loaded into routers. See http://www.syndesis.com for more information.

A network element manufacturer determines the format used for configuration data. For example, Cisco routers and switches use a text format that is defined in documents at http://www.cisco.com. Information about other vendors can be found at their Web sites.

The customer receives the NE 110 from the FS 104 and connects it to the network 106 at step 1816. The customer 114 connects the MDT 1704 to the NE 110 at step 1818. This connection can be achieved by a short-range wireless, infrared, or wireless link. The customer 114 uses the MDT 1704 to request a Web page from the PS 1702 at step 1820. A Web browser on the MDT 1704 can be used for this purpose.

The customer 114 uses the MDT 1704 to authenticate to the PS 1702 at step 1822. This is done with the data that was received at step 1804. A Web page and applet are downloaded from the PS 1702 to MDT 1704 at step 1824. The applet and NE 110 hand shake at step 1826. The unique serial number of the NE 110 is transferred to the applet during this exchange. This value is checked at step 1828. If it does not equal the value that is stored in NE Database on the PS 1702, an error message is displayed at step 1830 and execution stops. Otherwise, execution proceeds to step 1834.

The applet transmits the PS network address/port and shared secret to the NE 110 at step 1834. The NE 110 uses the shared secret to establish a secure channel to the PS 1702 at step 1836. The NE 110 downloads its configuration file from the PS 1702 at step 1838 and enters normal operation at step 1840.

Figure 19:
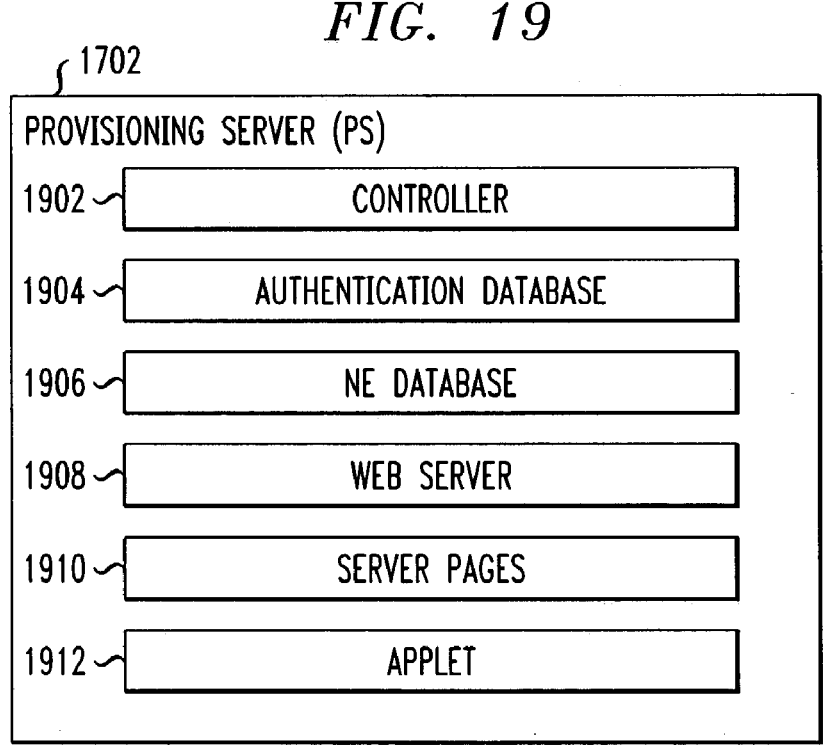
FIG. 19 shows a block diagram of the modified PS.

FIG. 19 shows a block diagram of the Provisioning Server (PS) 1702. Controller 1902 is the code that manages the operation of the PS 1702. Authentication Database 1904 stores information that is used to authenticate customers. NE Database 1906 stores information that is used to process requests from NEs. Web server 1908, server pages 1910, and applet 1912 provide the user interface and control logic for the MDT 1704.

Figure 20:
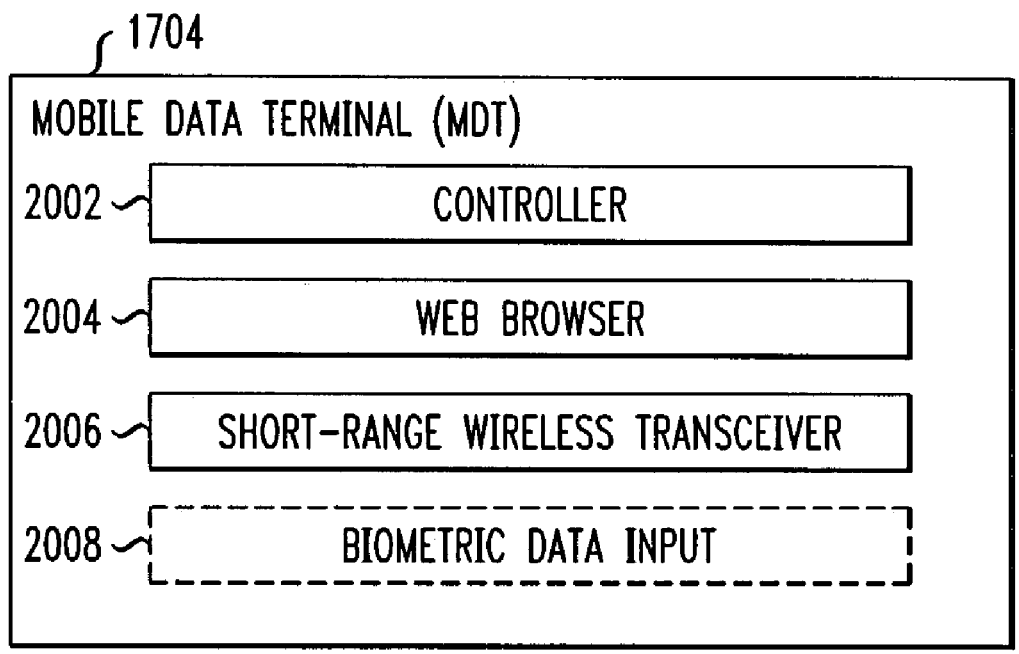
FIG. 20 shows a block diagram of an enhanced Mobile Data Terminal (MDT).

FIG. 20 shows a block diagram of an enhanced Mobile Data Terminal (MDT) 1704. Controller 2002 is the code that manages the operation of the MDT 1704. Web browser 2004 displays server pages 1910 retrieved from Web server 1908. The browser also executes the Java applet 1912 that is contained in one of the server pages 1910. Short-range wireless transceiver 2006 is used to communicate with the enhanced NE 110. Biometric data input 2008 is optional. For example, an MDT 1704 may include a retinal or image scanner. It may include capabilities for handwriting or speech capture.

Figure 21:
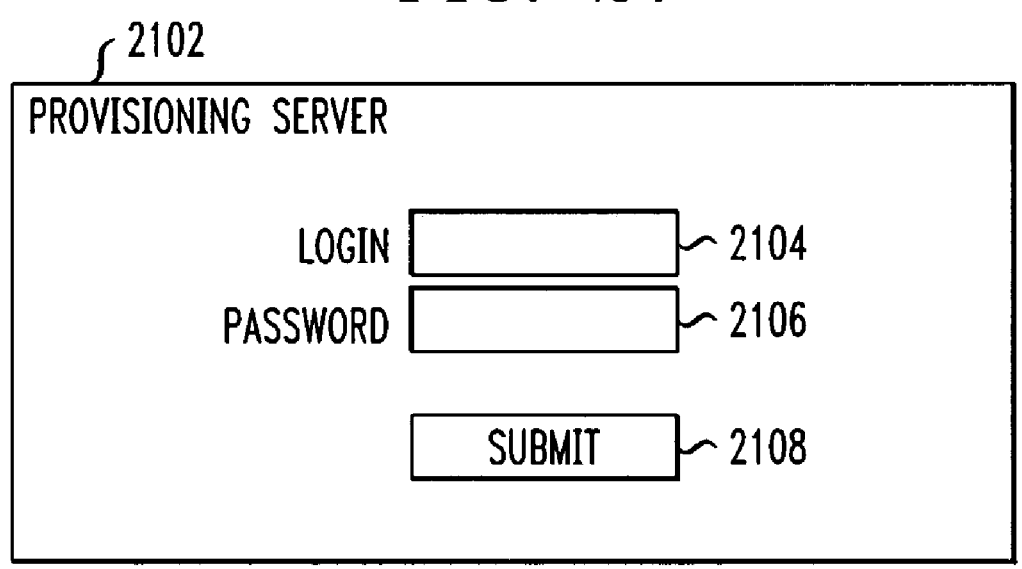
FIG. 21 shows a Web page for authentication to the PS.

FIG. 21 shows a Web page for authentication to the PS 1702. A customer requests this page from Web server 1908 on the PS 1702. A login is entered in text field 2104 and a password is entered in text field 2106. The submit button 2108 transmits these values from the browser to the server.

Figure 22:
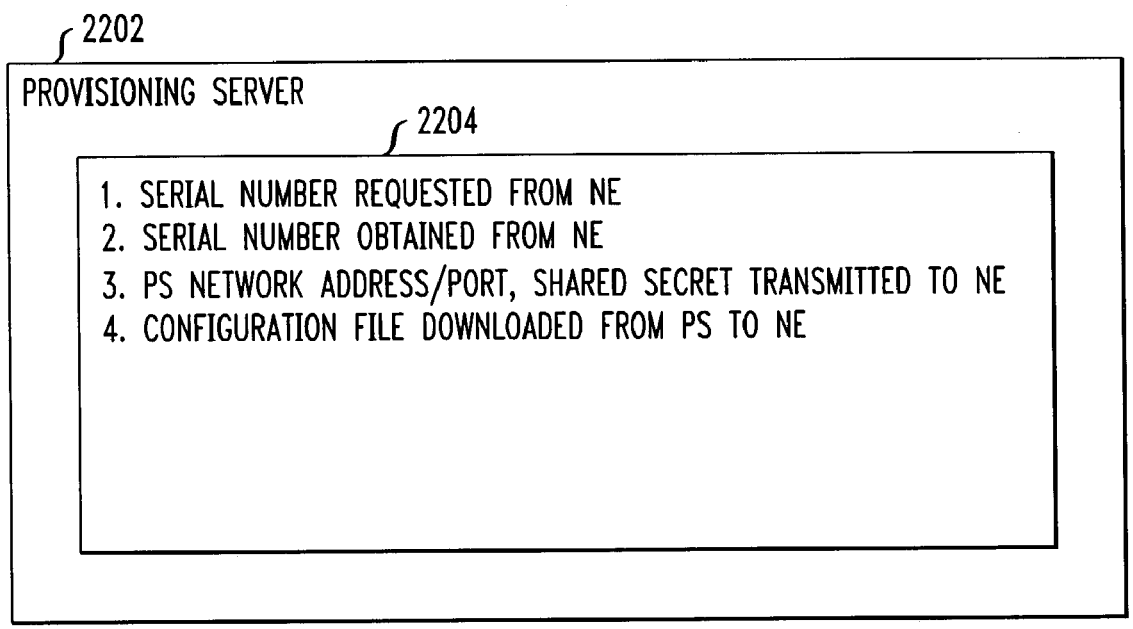
FIG. 22 shows a Web page for monitoring communication between an MDT and NE.

FIG. 22 shows a Web page for monitoring communication between an MDT 1704 and NE 110. This page is displayed after the customer has been authenticated. This page contains an applet that communicates with the NE 110 and PS 1702. Text box 2204 displays strings that report the interactions between these components.

The first line reports that the serial number has been requested from the NE 110. The second line reports that the serial number has been obtained from the NE 110. The third line reports that the PS network address/port and shared secret have been transmitted to the NE 110. The fourth line reports that the configuration file has been downloaded from the PS 1702 to the NE 110.

FIG. 23 shows a message sequence diagram. Message 2301 is an HTTP GET for the Web page shown in FIG. 21. This request is formatted according to the Hypertext Transfer Protocol (HTTP). Message 2302 is the HTTP response to this request. It includes the Hypertext Markup Language (HTML) for the page. Specifications for HTTP and HTML are available at http://www.ietf.org.

Message 2303 is an HTTP POST for the Web page shown in FIG. 21. The login 2104 and password 2106 values are transmitted from the Web browser 2004 to the Web server 1906. Message 2304 is the HTTP response.

The response is the Web page shown in FIG. 22. The page displays a text box 2204 in which the interactions between these components are reported. This page also contains a Java applet that communicates with the PS 1702 and NE 110. A complete discussion of Java technology is available at http://www.javasoft.com. Many books on this subject are also available.

Message 2305 is transmitted from the Java applet in Web page 2202 to the NE 110. The applet uses the short-range wireless transceiver 2006 on the MDT 1704 to communicate with the enhanced NE 110. It requests the serial number of the NE 110. Message 2306 is the response to this request.

Message 2307 is transmitted from the Java applet 1912 in Web page 2202 to the NE 110. It contains the PS network address/port and shared secret. The NE 110 uses these values to establish a secure channel to the PS 1702. The NE 110 then uses the secure channel to request its configuration file. Message 2308 is transmitted from the NE 110 to the Java apple 1912. This message indicates that the configuration file has been downloaded.

While the invention has been described with reference to specific embodiments, variations of the invention may be constructed without departing from the scope of the invention that is defined in the following claims.

We claim:

1. A method comprising the steps of:
  downloading a configuration file to a mobile data terminal from a provisioning server via a secure channel, the configuration file downloadable from the mobile data terminal to a network element, the network element being one of a router, switch, firewall, or gateway, the network element located at a customer premises, the configuration file adapted to configure the network element for operation, the configuration comprising a network topology, addresses, and security parameters, said downloading of the configuration file responsive to:
  a connection created between the network element and the mobile data terminal;
  a web page requested by the mobile data terminal from the provisioning server;
  a customer request, the customer authenticated to the provisioning server via the web page;
  a second web page and an applet downloaded from the provisioning server after customer authentication;
  a handshake is established between the network element and the applet;
  a serial number received from the network element during the handshake;
  a determination if the received serial number matches a serial number stored by the mobile data terminal; and
  if a match occurred, a provisioning server network address/port and shared secret transmitted to the network element, the shared secret configured to create the secure channel, the shared secret computed by a random number generator.

2. The method of claim 1 wherein said connection between said network element and the mobile data terminal occurs via short-range wireless transceivers.

3. The method of claim 1 wherein said mobile data terminal is a cellular telephone.

4. The method of claim 1 wherein the mobile data terminal is a portable digital assistant.

5. The method of claim 1 wherein the mobile data terminal is a laptop computer.

6. The method of claim 1 wherein the mobile data terminal is a wearable computer.

7. The method of claim 1 wherein said applet communicates between the network element and the provisioning server.

8. The method of claim 1 wherein said mobile data terminal is capable of receiving biometric data.

9. The method of claim 8 wherein said biometric data includes retinal data.

10. The method of claim 8 wherein said biometric data includes fingerprint data.

11. The method of claim 8 wherein said biometric data includes speech data.

12. The method of claim 8 wherein said biometric data includes handwriting data.

13. The method of claim 1 further comprising the step of:
  receiving a confirmation message from the network element that a configuration file has been downloaded from the provisioning server.

* * * * *